United States Patent
Kovac (10) Patent No.: US 12,411,764 B2
(45) Date of Patent: Sep. 9, 2025

(54) MULTI-CHIPLET MODULE SYSTEM, METHOD AND DEVICE

(71) Applicant: Marvell Asia Pte Ltd, Singapore (SG)

(72) Inventor: Martin Kovac, Newmarket (CA)

(73) Assignee: Marvell Asia PTE, LTD, Singapore (SG)

( * ) Notice: Subject to any disclaimer, the term of this patent is extended or adjusted under 35 U.S.C. 154(b) by 2 days.

(21) Appl. No.: 18/607,491

(22) Filed: Mar. 17, 2024

(65) Prior Publication Data

US 2024/0330183 A1    Oct. 3, 2024

Related U.S. Application Data

(60) Provisional application No. 63/455,078, filed on Mar. 28, 2023.

(51) Int. Cl.
*G06F 12/08* (2016.01)
*G06F 12/0806* (2016.01)

(52) U.S. Cl.
CPC .............. *G06F 12/0806* (2013.01)

(58) Field of Classification Search
CPC .................................. G06F 12/0806
See application file for complete search history.

(56) References Cited

U.S. PATENT DOCUMENTS

2021/0312055 A1\* 10/2021 Kloth ............... H04L 9/0866

\* cited by examiner

*Primary Examiner* — Jae U Yu (57) ABSTRACT

A multi-chiplet module system, method and device including a memory storing chiplet operational data and a plurality of chiplets serially operably coupled to each other forming a chiplet chain. The chiplets in the middle and at one end of the chain each include a local cache with the chiplet at the one end of the chain coupling with the memory. When one of the chiplets requires data stored on the memory it checks the local cache (if it has one), and if not in the local cache, it then queries the cache of the next chiplet in the chain until the required data is propagated from the memory up the caches of the chain to the requesting chiplet.

36 Claims, 3 Drawing Sheets

MULTI-CHIPLET MODULE SYSTEM, METHOD AND DEVICE

RELATED APPLICATIONS

This application claims priority under 35 U.S.C. § 119 (e) of the co-pending U.S. provisional patent application Ser. No. 64/455,078 filed Mar. 28, 2023, and titled "EFFICIENT SHARING OF EXTERNAL MEMORY," which is hereby incorporated by reference.

FIELD OF INVENTION

The present invention relates to multi-chiplet module systems, methods and devices. More particularly, the present invention relates to efficient sharing of external memory in multi-chiplet module systems, methods and devices.

BACKGROUND OF THE INVENTION

With the emergence of multi-chiplet modules (MCMs), the number of central processing units (CPUs) that need to be booted during the initialization process of the MCM has significantly increased. Further, because the CPU of every chiplet of the MCM will need to access an external flash memory to fetch its secondary bootloader, the result is many package pins and significant increase in cost for the circuit board as many additional external flash memories are required. These additional costs undercut the advantages of using a MCM rather than a traditional system on chip.

BRIEF SUMMARY OF THE INVENTION

A multi-chiplet module system, method and device including a memory storing chiplet operational data and a plurality of chiplets serially operably coupled to each other forming a chiplet chain. The chiplets in the middle and at one end of the chain each include a local cache with the chiplet at the one end of the chain coupling with the memory. When one of the chiplets requires data stored on the memory, it checks the local cache (if it has one), and if not in the local cache, it then queries the cache of the next chiplet in the chain. If not found there, the next chiplet queries the cache of the subsequent chiplet in the chain until the desired data is found or the chiplet at the end of the chain retrieves the desired data from the memory and stores it in its local cache. In this manner, the required data propagates from the memory up the local caches of the chiplets in the chain. Indeed, although the initial request is able to require the data to propagate up the chain all the way from the memory to the requesting chiplet, because the same data is often required by many of the chiplets around the same time, when subsequent chiplets request the same data, it will already be stored in its local cache and/or the local cache of another chiplet in the chain such that the main memory does not need to be accessed. Thus, the system, method and device provides the advantage of providing a plurality of chiplets efficient access to required data stored on memory without needing to provide each chiplet with direct access to memory or to wait for all memory request/responses to propagate all the way to the memory and back. This both reduces the cost of the multi-chiplet module as well as improve the speed and efficiency of chiplet memory access/performance.

A first aspect is directed to a data processing system. The system comprises a computer-readable memory storing chiplet operational data including boot data, a multi-chiplet module for providing a set of functions, the multi-chiplet module including a plurality of chiplets each configured to perform a subset of the set of functions, wherein the plurality of chiplets are serially operably coupled to each other forming a chiplet chain, and further wherein, during a chiplet boot process, upon receiving a request for the boot data from another of the chiplets, each request-receiving chiplet of the chiplets checks a local cache of the request-receiving chiplet for the requested boot data and returns the requested boot data to the another of the chiplets when the boot data is found in the local cache of the request-receiving chiplet and transmits the request for the boot data to a next of the chiplets along the chiplet chain when the boot data is not found in the local cache of the request-receiving chiplet.

In some embodiments, upon receiving the boot data from the next of the chiplets along the chiplet chain, each request-receiving chiplet of the chiplets stores the boot data in the local cache of the request-receiving chiplet. In some embodiments, the chiplet chain includes a first of the chiplets that is operably coupled to the memory at a first end of the chiplet chain, a last of the chiplets that is at a second end of the chiplet chain opposite the first end, and a remainder of the chiplets positioned in the chiplet chain between the first chiplet and the last chiplet. In some embodiments, the last and the remainder of the chiplets are not directly operably coupled with the memory. In some embodiments, not the last of the chiplets, but the first and the remainder of the chiplets each include the local cache, a local cache controller and a local cache arbitrator. In some embodiments, when the another of the chiplets is one of the remainder of the chiplets, the another of the chiplets checks the local cache of the another of the chiplets for the boot data before sending the request for the boot data to the request-receiving chiplet. In some embodiments, upon receiving a plurality of requests for access to the local cache, the local cache arbiter determines which of the requests to process first.

In some embodiments, the memory is a static random access memory. In some embodiments, the boot data comprises a secondary bootloader for performing one or more initializations for the chiplets. In some embodiments, the system further comprises a plurality of additional chiplets each configured to perform a different subset of the set of functions, wherein the plurality of additional chiplets are serially operably coupled to each other forming an additional chiplet chain. In some embodiments, during the chiplet boot process, upon receiving a request for additional boot data from the another of the chiplets, each request-receiving chiplet of the chiplets checks the local cache of the request-receiving chiplet for the additional boot data and returns the additional boot data to the another of the chiplets when the additional boot data is found in the local cache of the request-receiving chiplet and transmits the request for the additional boot data to the next of the chiplets along the chiplet chain when the additional boot data is not found in the local cache of the request-receiving chiplet. In some embodiments, upon receiving the additional boot data from the next of the chiplets along the chiplet chain, each request-receiving chiplet of the chiplets replaces the boot data with the additional boot data in the local cache of the request-receiving chiplet.

A second aspect is directed to a multi-chiplet module comprising a plurality of chiplets each configured to perform a subset of a set of functions of the multi-chiplet module, wherein the plurality of chiplets are serially operably coupled to each other forming a chiplet chain, and further wherein, during a chiplet boot process, upon receiving a request for the boot data from another of the chiplets, each request-receiving chiplet of the chiplets checks a local cache of the request-receiving chiplet for the requested boot data and returns the requested boot data to the another of the chiplets when the boot data is found in the local cache of the request-receiving chiplet and transmits the request for the boot data to a next of the chiplets along the chiplet chain when the boot data is not found in the local cache of the request-receiving chiplet.

In some embodiments, upon receiving the boot data from the next of the chiplets along the chiplet chain, each request-receiving chiplet of the chiplets stores the boot data in the local cache of the request-receiving chiplet. In some embodiments, the chiplet chain includes a first of the chiplets positioned at a first end of the chiplet chain and operably coupled to a memory storing the boot data, a last of the chiplets that is at a second end of the chiplet chain opposite the first end, and a remainder of the chiplets positioned in the chiplet chain between the first chiplet and the last chiplet. In some embodiments, the last and the remainder of the chiplets are not directly operably coupled with the memory. In some embodiments, not the last of the chiplets, but the first and the remainder of the chiplets each include the local cache, a local cache controller and a local cache arbitrator. In some embodiments, when the another of the chiplets is one of the remainder of the chiplets, the another of the chiplets checks the local cache of the another of the chiplets for the boot data before sending the request for the boot data to the request-receiving chiplet. In some embodiments, upon receiving a plurality of requests for access to the local cache, the local cache arbiter determines which of the requests to process first.

In some embodiments, the boot data comprises a secondary bootloader for performing one or more initializations for the chiplets. In some embodiments, the multi-chiplet module further comprises a plurality of additional chiplets each configured to perform a different subset of the set of functions, wherein the plurality of additional chiplets are serially operably coupled to each other forming an additional chiplet chain. In some embodiments, during the chiplet boot process, upon receiving a request for additional boot data from the another of the chiplets, each request-receiving chiplet of the chiplets checks the local cache of the request-receiving chiplet for the additional boot data and returns the additional boot data to the another of the chiplets when the additional boot data is found in the local cache of the request-receiving chiplet and transmits the request for the additional boot data to the next of the chiplets along the chiplet chain when the additional boot data is not found in the local cache of the request-receiving chiplet. In some embodiments, upon receiving the additional boot data from the next of the chiplets along the chiplet chain, each request-receiving chiplet of the chiplets replaces the boot data with the additional boot data in the local cache of the request-receiving chiplet.

A third aspect is directed to a method of implementing a multi-chiplet module system for providing a set of functions. The method comprises storing chiplet operational data including boot data on a computer readable memory, providing a plurality of chiplets each configured to perform a subset of the set of functions, wherein the plurality of chiplets are serially operably coupled to each other forming a chiplet chain, upon receiving a request for the boot data from another of the chiplets, with each request-receiving chiplet of the chiplets checking a local cache of the request-receiving chiplet for the requested boot data and returns the requested boot data to the another of the chiplets when the boot data is found in the local cache of the request-receiving chiplet and transmitting the request for the boot data to a next of the chiplets along the chiplet chain when the boot data is not found in the local cache of the request-receiving chiplet.

In some embodiments, the method further comprises upon receiving the boot data from the next of the chiplets along the chiplet chain, with each request-receiving chiplet of the chiplets, storing the boot data in the local cache of the request-receiving chiplet. In some embodiments, the chiplet chain includes a first of the chiplets that is operably coupled to the memory at a first end of the chiplet chain, a last of the chiplets that is at a second end of the chiplet chain opposite the first end, and a remainder of the chiplets positioned in the chiplet chain between the first chiplet and the last chiplet. In some embodiments, the last and the remainder of the chiplets are not directly operably coupled with the memory. In some embodiments, not the last of the chiplets, but the first and the remainder of the chiplets each include the local cache, a local cache controller and a local cache arbitrator. In some embodiments, the method further comprises when the another of the chiplets is one of the remainder of the chiplets, checking the local cache of the another of the chiplets for the boot data before sending the request for the boot data to the request-receiving chiplet. In some embodiments, the method further comprises upon receiving a plurality of requests for access to the local cache, determining with the local cache arbiter which of the requests to process first.

In some embodiments, the memory is a static random access memory. In some embodiments, the boot data comprises a secondary bootloader for performing one or more initializations for the chiplets. In some embodiments, the method further comprises providing a plurality of additional chiplets each configured to perform a different subset of the set of functions, wherein the plurality of additional chiplets are serially operably coupled to each other forming an additional chiplet chain. In some embodiments, the method further comprises, during the chiplet boot process, upon receiving a request for additional boot data from the another of the chiplets, with each request-receiving chiplet of the chiplets checking the local cache of the request-receiving chiplet for the additional boot data and returning the additional boot data to the another of the chiplets when the additional boot data is found in the local cache of the request-receiving chiplet and transmitting the request for the additional boot data to the next of the chiplets along the chiplet chain when the additional boot data is not found in the local cache of the request-receiving chiplet. In some embodiments, the method further comprises upon receiving the additional boot data from the next of the chiplets along the chiplet chain, with each request-receiving chiplet of the chiplets, replacing the boot data with the additional boot data in the local cache of the request-receiving chiplet.

A fourth aspect is directed to a data processing system. The system comprises means for storing chiplet operational data including boot data, means for providing a set of functions, the means for providing a set of functions including a plurality of chiplets each configured to perform a subset of the set of functions, wherein the plurality of chiplets are serially operably coupled to each other forming a chiplet chain, and further wherein, during a chiplet boot process, upon receiving a request for the boot data from another of the chiplets, each request-receiving chiplet of the chiplets checks a local cache of the request-receiving chiplet for the requested boot data and returns the requested boot data to the another of the chiplets when the boot data is found in the local cache of the request-receiving chiplet and transmits the request for the boot data to a next of the chiplets along the chiplet chain when the boot data is not found in the local cache of the request-receiving chiplet.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to multi-chiplet module system, method and device including a memory storing chiplet operational data and a plurality of chiplets serially operably coupled to each other forming a chiplet chain. The chiplets in the middle and at one end of the chain each include a local cache with the chiplet at the one end of the chain coupling with the memory. When one of the chiplets requires data stored on the memory, it checks the local cache (if it has one), and if not in the local cache, it then queries the cache of the next chiplet in the chain. If not found there, the next chiplet queries the cache of the subsequent chiplet in the chain until the desired data is found or the chiplet at the end of the chain retrieves the desired data from the memory and stores it in its local cache.

In this manner, the required data propagates from the memory up the local caches of the chiplets in the chain. Indeed, although the initial request is able to require the data to propagate up the chain all the way from the memory to the requesting chiplet, because the same data is often required by many of the chiplets around the same time, when subsequent chiplets request the same data, it will already be stored in its local cache and/or the local cache of another chiplet in the chain such that the main memory does not need to be accessed. Thus, the system, method and device provides the advantage of providing a plurality of chiplets efficient access to required data stored on memory without needing to provide each chiplet with direct access/coupling to memory or to wait for all memory request/responses to propagate all the way to the memory and back. This both reduces the cost of the multi-chiplet module as well as improve the speed and efficiency of chiplet memory access/performance.

Figure 1:
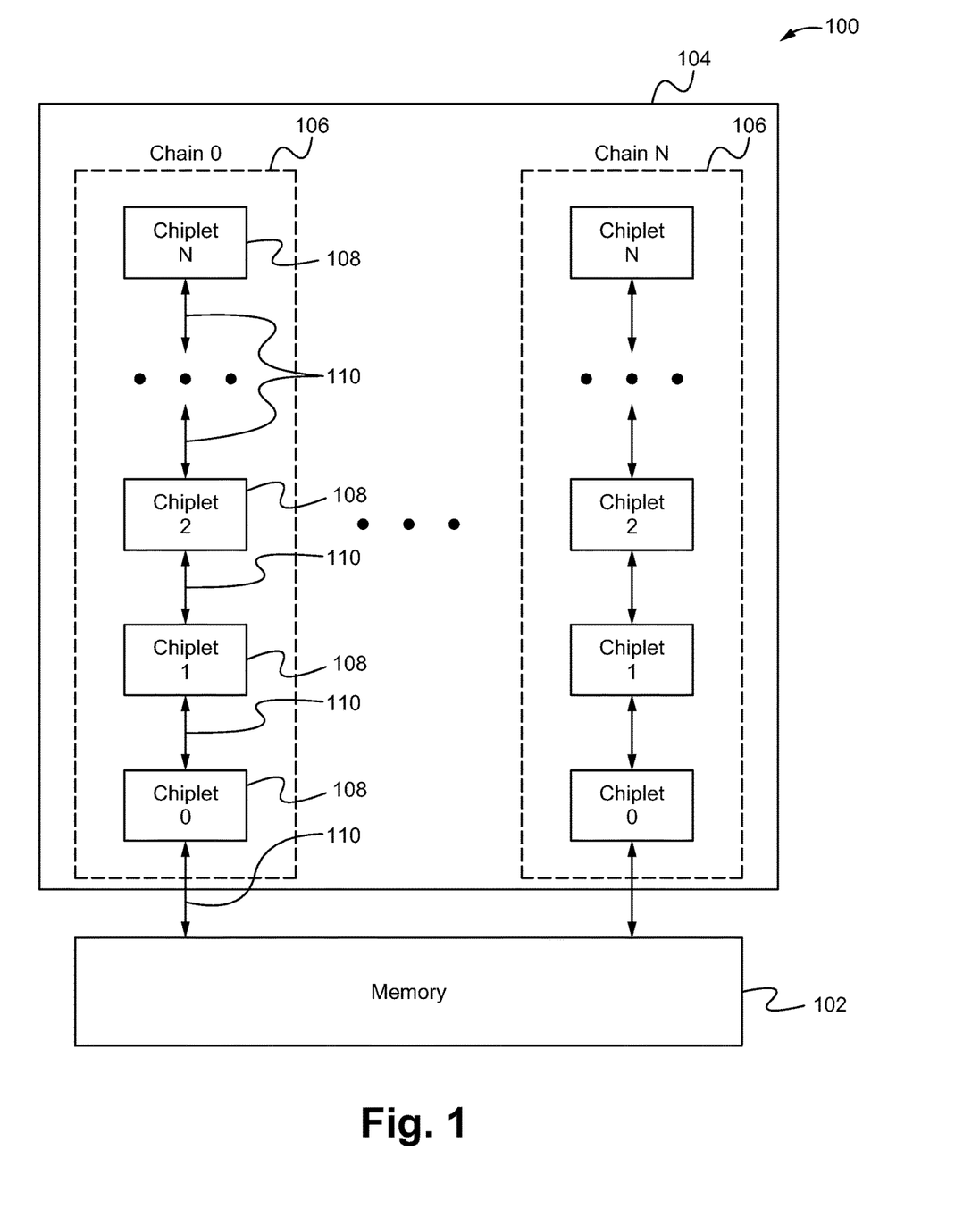
FIG. 1 illustrates a data processing system according to some embodiments.

FIG. 1 illustrates a data processing system 100 according to some embodiments. As shown in FIG. 1, the system 100 comprises a memory 102 and a multi-chiplet module (MCM) 104 operably coupled together via one or more wire and/or wireless networks 110. The MCM 104 is able to include one or more chiplet chains 106 that are each formed by a plurality of chiplets 108 serially coupled together via the networks 110. Although as shown in FIG. 1, the MCM 104 includes two chains 106 each having four chiplets 108, more or less chains 106 each having more or less chiplets 108 are contemplated. In particular, the MCM 104 is able to include one or any number of chains 106 wherein each of the chains 106 are able to include two or more chiplets 108. Further, although as shown in FIG. 1 each of the chains 106 have an equal quantity of chiplets 108, the chains 106 of the MCM 104 are able to be made up of different numbers of chiplets 108. In some embodiments, the MCM 104, network 110 and memory 102 are able to be a part of network switch wherein the chiplets 108 of the MCM 104 and the memory 102 are physically coupled to a substrate (e.g. circuit board) and/or electrically coupled together via the wired or wireless network 110 (e.g. via an interposer and/or bus). Alternatively or in addition, the MCM 104, network 110 and memory 102 are able to be a part of any integrated circuit and/or device. The system 100 is able to be a part of an integrated circuit. For example, the memory 102, MCM 104 and networks 110 are able to be physically and/or electrically coupled together via a circuit substrate/interposer and/or one or more wires/traces. In some embodiments, the integrated circuit is able to be a top of rack switch. Alternatively, the system 100 is able to be a part of any electronic device or circuit utilizing an MCM 104.

The network 110 is able to comprise one or more Quad Serial Peripheral Interfaces (QSPI). Alternatively, the network 110 is able to comprise other types of interfaces and/or buses for transmitting the data between the chiplets 108 of the chains 106 and/or between the MCM 104 and the memory 102. The memory 102 is able to comprise external flash memory. Alternatively, the memory 102 is able to comprise one or more of dynamic random access memory (DRAM), random access memory (RAM), ternary content addressable memory (TCAM), static random access memory (SRAM), remote storage, storage media, global system memory, memory modules, or other types of memory. In some embodiments, the memory 102 is able to be at least partially transitory. Alternatively, the memory 102 is non-transitory. The memory 102 is able to store chiplet data (e.g. data that is used by the chiplets 108 to perform one or more functions of the system 100). In some embodiments, the chiplet data is able to comprise chiplet boot data (e.g. primary and/or secondary boot loader data) required by one or more of the chiplets 108 to complete their boot/startup processes (e.g. initializations, etc.). Alternatively or in addition, the chiplet data is able to be any data utilized by the chiplets 108 for performing their functions on the system 100.

The chiplet chains 106 are able to comprise a memory end where an end chiplet (e.g. chiplet 0) is coupled to the memory 102 and a remote end where a beginning chiplet (e.g. chiplet N) is farthest away from the memory 102. In some embodiments, the chiplet 108 physically positioned closest to the memory 102 on the system 100 (e.g. integrated circuit) and/or first to start their boot process (e.g. first to request data from the memory 102 relative to the other chiplets 108 of the chain 106) is able to be selected as the end chiplet 108. Similarly, the chiplet 108 physically positioned farthest from the memory 102 on the system 100 and/or last to start their boot process (e.g. last to request data from the memory 102 relative to the other chiplets 108 of the chain 106) is able to be selected as the beginning chiplet 108. Alternatively, any of the chiplets 108 of the MCM 104 are able to be selected as the beginning or end chiplets 108 regardless of their proximity to the memory 102 and/or boot timing.

Figure 2:
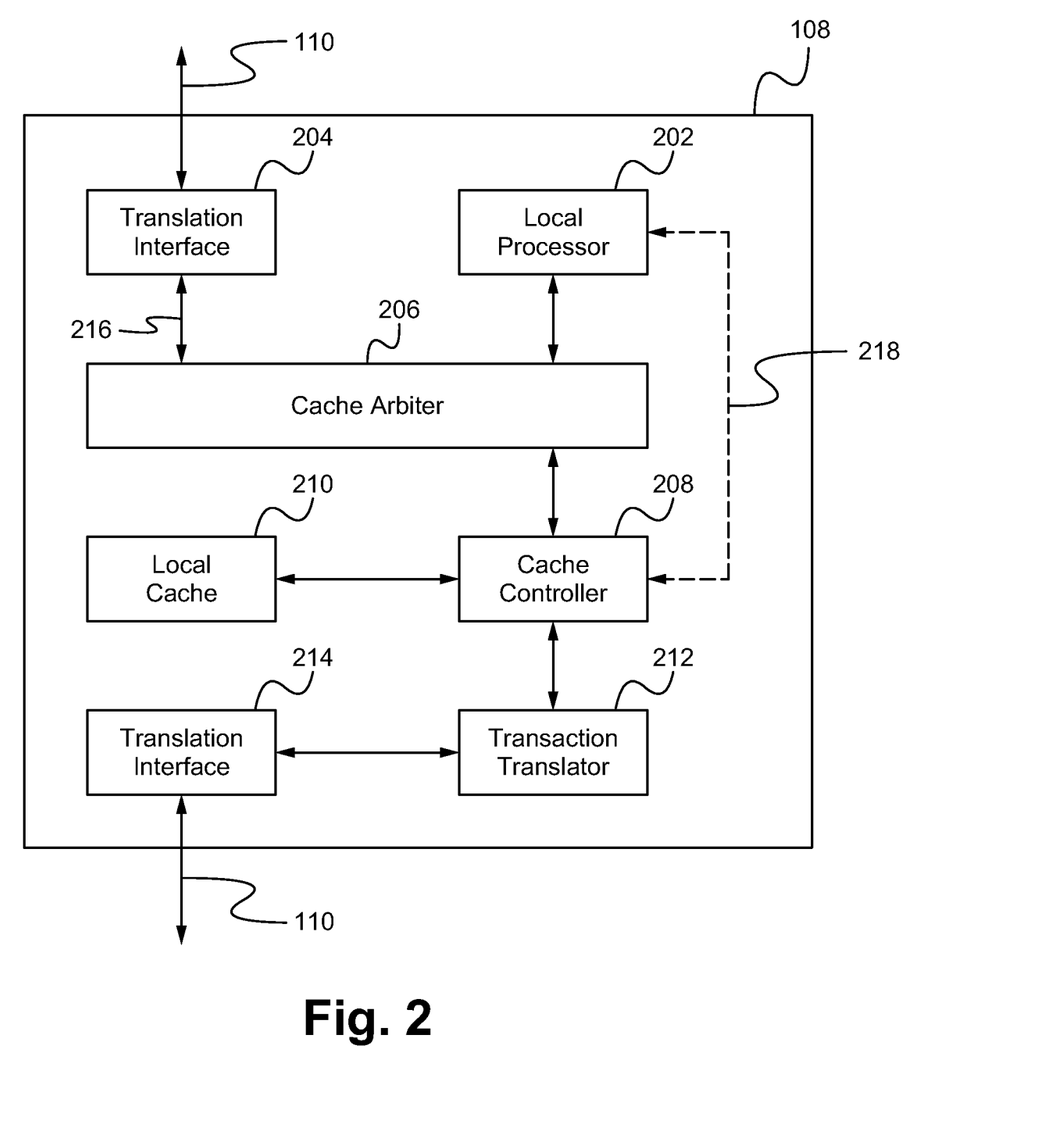
FIG. 2 illustrates a detailed view of an exemplary chiplet according to some embodiments.

FIG. 2 illustrates a detailed view of an exemplary chiplet 108 according to some embodiments. As shown in FIG. 2, the chiplet 108 comprises a local processor 202, a translation interface 204, a cache arbiter 206, a cache controller 208, a local cache 210, a transaction translator 212 and another translation interface 214 all coupled together via an internal network 216. In some embodiments, the translation interfaces 204, 214 are able to be a single translation interface that performs the functions of both. In some embodiments, the internal network 216 has an additional connection 218 between the local processor 202 and the controller 208 for repairing the controller 208 and/or cache 210 when errors occur. Alternatively, the additional connection 218 is able to be omitted. In some embodiments, the network 216 is able to be and/or use an advanced high performance bus protocol. Alternatively, the network 216 is able to be/use other protocols (and the components within the network 216 are able to be interfaces/components that correspond to the other protocols). In some embodiments, when the chiplet 108 to chiplet 108 communication protocol (e.g. used on the network 110) is the same as the internal chiplet 108 communication protocol (e.g. used on the network 216), the translation interfaces 204, 214 and/or the transaction translator 212 are able to be omitted. Further, it should be noted that the chiplet 108 is able to comprise one or more additional components well known in the art for performing its subset of the functions of the system 100, but said components are not described herein for the sake of brevity.

In some embodiments, the beginning chiplets 108 do not include and/or utilize the cache 210, arbiter 206 and/or controller 208 such that they only include the processor 202 and the translation interfaces 204, 214 and/or transaction translator 212 (if necessary). In particular, because of their position at the start of the chain 106, the beginning chiplets 108 do not receive requests from other chiplets 108 and thus do not require the cache 210, arbiter 206 and/or controller 208. In some embodiments, despite not having the arbiter 206, the beginning chiplets 108 are still able to include the cache 210 and controller 208 such that they are able to sometimes store and/or find their required data in their local cache 210 and so not need to send a request to the adjacent chiplet 108. In operation, the beginning chiplets 108 are able to skip any arbitration steps described herein and, if they do not include the local cache/controller 210, 208, skip checking the local cache 210 for and updating the cache 210 for desired data (since they do not have a local cache 210).

The translation interface 204 is able to receive and convert requests for data from other chiplets 108 formatted according to an external communication protocol (e.g. quad serial peripheral interface) into an internal chiplet communication protocol (e.g. advanced high-performance bus). After receiving and converting the requests, the translation interface 204 is able to forward the translated requests to the cache arbiter 206 via the internal network 216. Similarly, when requested data is found in the cache 210, the translation interface 204 is able to receive and convert the response messages containing the data from the internal chiplet protocol to the external chiplet protocol. After receiving and converting the responses, the translation interface 204 is able to forward the translated responses to the adjacent chiplet 108 via the network 110. Indeed, in some embodiments the cache controller 208 is able to be directly coupled with the translation interface 204 for providing the response messages from the cache 210 to the interface 204 via the controller 208. In some embodiments, the translation interface 204 is a quad serial peripheral interface (QSPI) bridge. Alternatively, other interfaces are able to be used.

The local processor 202 is able to determine when data is needed by the chiplet 108 from the memory 102 for one or more processes and generate and transmit a request for the data to the cache arbiter 206. For example, during startup/boot of the chiplet 108, the processor 202 is able to determine that boot data (e.g. a primary or secondary bootloader) is needed from the memory 102 and transmit a request for the boot data to the cache arbiter 206. The local processor 202 is able to comprise one or more processing cores and/or other processing elements known in the art. In beginning chiplets 108 that do not include a cache 210, the processor 202 is able to transmit the request for the data directly to the next chiplet 108 in the chain 106 via the interface 214 and/or translator 212 (described below). Additionally, in some embodiments the local processor 202 is able to monitor and/or issue reset or repair commands to the cache controller 208 and/or cache 210 using the additional connection 218. In this way, the local processor 202 is able to reset, prepopulate with desired data and/or otherwise adjust the functioning and/or data stored in the local cache 210.

Each cycle, the cache arbiter 206 receives up to two requests for data that may be stored in the cache 210. Specifically, the arbiter 206 is able to receive a request from the local processor 202 and/or the arbiter 206 is able to receive a request for data from (the cache controller 208 of) an adjacent chiplet 108 in the chain 106 (e.g. the adjacent chiplet 108 that is farther away from the memory 102 through the chain 106). If only one request is received (e.g. during a cycle), the arbiter 206 transmits the single request to cache controller 208. If two requests are received (e.g. during a cycle), the arbiter 206 selects one of the requests based on a selection metric and transmits the selected request to the cache controller 208. The selection metric is able to comprise one of the group including, but not limited to: always selecting the request from the local processor 202; always selecting the request from the adjacent chiplet 108; and alternating between selecting the request from the local processor 202 and the request from the adjacent chiplet 108 (each cycle that two requests are received). In some embodiments, the cache arbiter 206 comprises a multiplexor, advanced high-performance bus interconnect and/or other type of interconnect. Alternatively, other types of arbiters are able to be used.

The local cache 210 is able to be a transitory and/or non-transitory computer-readable memory that is proximate and/or a part of the chiplet 108 (e.g. separate from the memory 102). For example, in some embodiments, the cache 210 is able to be SRAM. Alternatively, the local cache 210 is able to comprise one or more of dynamic random access memory (DRAM), random access memory (RAM), ternary content addressable memory (TCAM), static random access memory (SRAM), storage media, memory modules, or other types of memory. The local cache 210 is able to store a subset of the chiplet data of the system 100 (e.g. data that is used by the chiplets 108 to perform one or more functions of the system 100). In some embodiments, the chiplet data is able to comprise chiplet boot data (e.g. primary and/or secondary boot loader data) required by one or more of the chiplets 108 to complete their boot/startup processes (e.g. initializations, etc.). Alternatively or in addition, the chiplet data is able to be any data utilized by the chiplets 108 for performing their functions on the system 100. The size of the cache 210 is able to vary from chiplet 108 to chiplet 108. Alternatively, the each of the caches 210 are able to be the same size (within each chain 106 or for all of the caches 210 of all of the chains 106).

The cache controller 208 is able to receive the request for data selected by the arbiter 206 and checks if the local cache 210 is storing the desired data. If the desired data is found in the cache 210, the cache controller 208 retrieves the data and generates and transmits one or more response messages including the requested data from the cache 210 to the source of the request (e.g. either the local processor 202 or the adjacent chiplet 108). In some embodiments, the controller 208 is able to transmit the responses to the arbiter 206 which forwards them to the local processor 202 or adjacent chiplet 108 (via the translation interface 204). Alternatively, the controller 208 is able to be directly coupled with and directly send the responses to the local processor 202 or the adjacent chiplet 204 (via the translation interface 204).

If the data is not found in the cache 210, the controller 208 generates and transmits a request for the data to the next chiplet 108 (e.g. the chiplet next closest to the memory 102 in the chain 106) or the memory 102 itself via the translator 212 and/or the translation interface 214. Indeed, from the perspective of the receiving next chiplet 108, this request from the controller 208 is a request from the "adjacent" chiplet 108 that is received by the arbiter 206 of the next chiplet 108 and handled by the arbiter 206 in the same manner as described above. Additionally, in some embodiments the controller 208 is able to generate and transmit a cache miss message to the source (e.g. either the local processor 202 or the adjacent chiplet 108) of the received request indicating that the requested data was not in the cache 210.

After sending requests to the next chiplet 108 or memory 102, the controller 208 is able to receive (via the translation interface 204 and/or transaction translator 212) one or more responses from the next chiplet 108 or memory 102 either including the requested data or indicating that the requested data was not in the local cache 210 of the next chiplet 108 (a cache miss) or in the memory 102 (a system error). When a response includes the requested data, the controller 208 adds the requested data to the local cache 210 such that the next cycle when the data is requested by the source again, instead of a cache miss, the controller 208 is able to respond with the requested data that is now stored in the cache 210. As a result, the chiplet 108 is able to provide the advantage of incrementally passing data up the chiplet chain 106 from local cache 210 to local cache 210 such that subsequent requests by the chiplets 108 for the same data are more likely to not require the data traveling the whole chain 106 again, but rather be already stored in a closer local cache 210.

Upon receiving the requested data, the controller 208 is able to overwrite existing data found in the cache 210, if necessary, in order to fit the requested data. In particular, in some embodiments when choosing which data already in the cache 210 to overwrite, the controller 208 is able to use a first in first out (FIFO) scheme such that the oldest data is overwritten first. Alternatively, other schemes (e.g. last in first out or other schemes known in the art) are able to be used to determine which data to delete to make room for the new data. In any case, the controller 208 is able to continually update the cache 210 in this manner such that it stores the most recently requested data.

Further, as described above, in some embodiments the cache controller 208 is able to receive additional commands from the local processor 202 via the additional connection 218, make changes to the local cache 210 based on the commands and/or provide responses to the commands to the local processor 202. As a result, in such embodiments the controller 208 is able to enable the cache 210 to be reset and/or errors in the cache to be addressed by the local processor 202. In some embodiments, the controller 208 is an advanced high-performance bus cache controller. Alternatively, the controller 208 is able to be other controllers known in the art.

The transaction translator 212 is able to translate transaction/request types received from the cache controller 208 (e.g. that correspond to the protocol of the that transaction/request types that correspond to a protocol of the internal network 216, such as, advanced high performance bus protocol) to the corresponding transaction types of the network 110 (e.g. QSPI transaction/request types). Once the type has been adjusted, the transaction translator 212 is able to transmit the adjusted requests to the translation interface 214. Similarly, upon receiving (translated) responses from the translation interface 214, the transaction translator 212 is able to adjust transaction/response types received from the interface 214 (e.g. QSPI transaction/response types) to the corresponding transaction types of the internal network 216 (e.g. advanced high performance bus protocol transaction types). Again, once the type has been adjusted, the transaction translator 212 is able to transmit the adjusted responses to the controller 208. In some embodiments, the transaction translator 212 comprises an advanced high performance bus finite state machine. Alternatively, the transaction translator 212 is able to comprise other types of transaction translators known in the art.

The translation interface 214 is able to be substantially similar to the translation interface 204 except that it receives adjusted requests from the translator 212 and incoming responses from the next chiplet 108 or memory 102. Specifically, the translation interface 214 is able to receive and convert responses from the next chiplets 108 or memory 102 formatted according to the external communication protocol (e.g. quad serial peripheral interface protocol) into an internal chiplet communication protocol (e.g. advanced high-performance bus protocol). After receiving and converting the requests, the translation interface 214 is able to forward the translated requests to the transaction translator 212 via the internal network 216. Similarly, the translation interface 214 is able to receive and convert the requests received from the controller 208 (via the translator 212) from the internal chiplet protocol to the external chiplet protocol. After receiving and converting the requests, the translation interface 214 is able to forward the translated requests to the next chiplet 108 or the memory 102 via the network 110. In some embodiments, the translation interface 214 is a quad serial peripheral interface (QSPI). Alternatively, other interfaces are able to be used.

In operation, for each of the chiplets 108, each time that the local processor 202 of a chiplet 108 needs certain data (e.g. chiplet boot data) that is found in the memory 102, the local processor 202 issues a request for the data to the cache arbiter 206. At the same time, the cache arbiter 206 is able to receive another request for data stored in the memory 102 from an adjacent chiplet 108 in the same chain 106 (e.g. the adjacent chiplet 108 farther away from the memory 102 than the request receiving chiplet 108). The arbiter 206 selects which of the requests to send to the cache controller 208 according to an arbitration scheme/metric. The cache controller 208 checks the local cache 210 for the requested data. If the requested data is found in the cache 210, the controller 208 fetches and returns the data to the source of the request (e.g. the adjacent chiplet 108 or the local processor 202) via the arbiter 206 and/or the translation interface 204. If the requested data is not found in the cache 210, the controller 208 generates and/or transmits a request for the data to the next chiplet 108 in the same chain 106 (e.g. the adjacent chiplet 108 closer to the memory 102 than the chiplet 108 including the controller 208) or the memory 102 (if the chiplet 108 is the last chiplet 108 in the chain 106 such that it is closest to the memory 102).

Upon receiving a response from the next chiplet 108 or memory 102 with the requested data (via the translation interface 214 and/or the transaction translator 212), the controller 208 stores the requested data within the cache 210 (replacing existing data if necessary). As a result, the next time the same data is requested by the local processor 202 and/or the adjacent chiplet 108, the cache controller 208 will find the data within the local cache 210 and return it to the source of the request such that they are able to use the data to perform their operations. This means that in cases where the same data is needed in the same sequence by many of the chiplets 108 concurrently (e.g. during boot operations), assuming the data is not already found in any of the caches 210, the data will be passed from the memory 102 up the chains 106 from cache 210 to cache 210. Thus, the required data requested by any one chiplet 108 in the chain 106 will often be only one or two caches 210 away (rather than only in the memory 102) because other chiplets 108 that are further ahead in the same data access sequence (e.g. boot sequence) will have requested the data and/or retrieved the data from memory 102 or adjacent caches 210 in previous cycles such that it is already in their cache 210. This provides the advantage of increasing the speed of access to the required data while not needing every chiplet 108 to have direct access to the memory 102 and/or forcing the memory 102 to deal with multiple requests for the same data around the same time.

Figure 3:
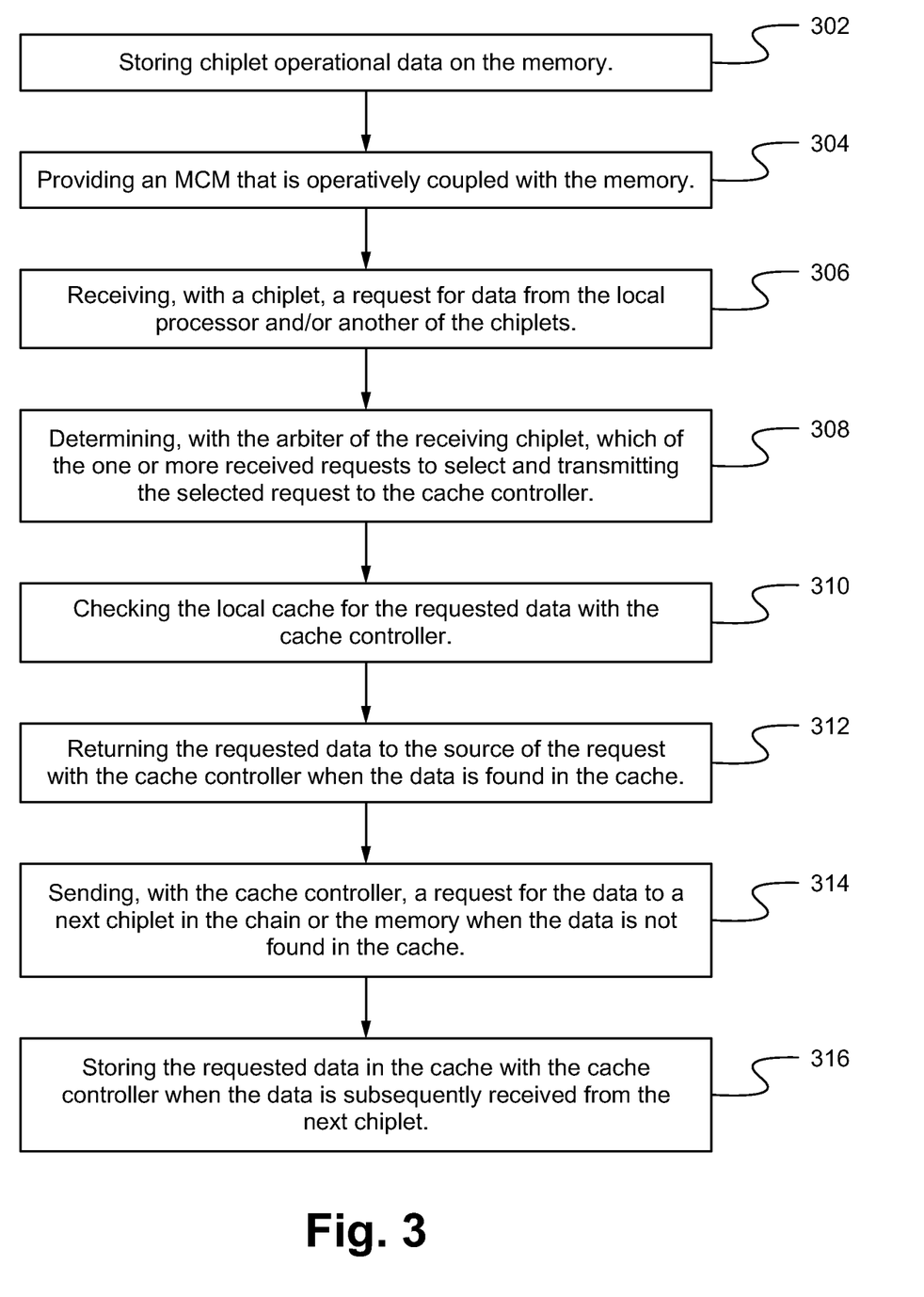
FIG. 3 illustrates a method of implementing a multi-chiplet module system according to some embodiments.

FIG. 3 illustrates a method of implementing a multi-chiplet module system 100 according to some embodiments. As shown in FIG. 3, chiplet operational data is stored on the memory 102 at the step 302. As described above, the operational data is able to be chiplet boot data and/or other types of chiplet data. An MCM 104 operatively coupled with the memory 102 is provided is provided at the step 304. As described above, the MCM 104 comprises one or more chiplet chains 106 each including a plurality of chiplets 108, wherein each of the chiplets 108 are configured to perform a subset of the functions of the system 100 and/or MCM 104. A chiplet 108 receives a request for data from the local processor 202 and/or another of the chiplets 108 at the step 306. The arbiter 218 determines which of the one or more received requests to select and transmits the selected request to the cache controller 208 at the step 308. The cache controller 208 checks the local cache 210 for the requested data at the step 310. The cache controller 208 returns the requested data to the source of the request when the data is found in the cache 210 at the step 312. The cache controller 208 sends a request for the data to a next chiplet 108 in the chain 106 or the memory 102 when the data is not found in the cache 210 at the step 314. As described above, the next chiplet 108 is the chiplet adjacent to the current chiplet 108, but closer to the memory 102 within the chain 106. The cache controller 208 stores the requested data in the cache 210 when the data is subsequently received from the next chiplet 108 at the step 316. As a result, the method provides the advantage of increasing the speed of access to the required data while not needing every chiplet 108 to have direct access to the memory 102 and/or forcing the memory 102 to deal with multiple requests for the same data around the same time.

The multi-chiplet module system, method and device described herein provides numerous advantages. Specifically, the system, method and device has the benefit of providing a plurality of chiplets efficient access to required data stored on memory without needing to provide each chiplet with direct access/coupling to memory or to wait for all memory request/responses to propagate all the way to the memory and back. This both reduces the cost of the multi-chiplet module as well as improve the speed and efficiency of chiplet memory access/performance.

While the multi-chiplet module system, method and device has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details. In particular, it should be noted that although not described in detail for the sake of brevity, the system 100 is able to include one or more of an integrated circuit for physical coupling with each of the components of the system 100 (e.g. including a substrate and/or an interposer), a network interface, additional memory, a processor, I/O device(s), a bus and a storage device. The additional memory and/or the other memory described herein is able to be any conventional computer memory known in the art such as, but not limited to, a hard drive, DRAM, RAM, SRAM, CDROM, CDRW, DVD, DVDRW, flash memory card or any other storage device. An example of a network interface includes a network card connected to an Ethernet or other type of LAN. The I/O device(s) are able to include one or more of the following: keyboard, mouse, monitor, display, printer, modem, touchscreen, button interface and other devices. The operating system(s), graphical user interface(s), application(s), module(s) and/or other software used to operate the chiplets 108 (and components thereof 202, 204, 206, 208, 210, 212, 214) are able to be stored in the memory 102 and/or additional memory and/or storage device and processed as applications are typically processed via the local processors 202 and/or other processors of the system 100. The chiplets and the MCM are able to comprise hardware, software, firmware and/or a combination of two or more of hardware, software and firmware such as memory, software/firmware and/or processors to execute the software/firmware stored on the memory in order to perform the functions of the chiplets/MCM. Indeed, the chiplets/MCM are able to comprise other components well known in the art, but not described herein for the sake of brevity.

I claim:

1. A data processing system, the system comprising:
    a computer-readable memory storing chiplet operational data including boot data;
    a multi-chiplet module for providing a set of functions, the multi-chiplet module including a plurality of chiplets each configured to perform a subset of the set of functions, wherein the plurality of chiplets are serially operably coupled to each other forming a chiplet chain, and further wherein, during a chiplet boot process, upon receiving a request for the boot data from another of the chiplets, each request-receiving chiplet of the chiplets:
        checks a local cache of the request-receiving chiplet for the requested boot data and returns the requested boot data to the another of the chiplets when the boot data is found in the local cache of the request-receiving chiplet; and
        transmits the request for the boot data to a next of the chiplets along the chiplet chain when the boot data is not found in the local cache of the request-receiving chiplet.

2. The system of claim 1, wherein upon receiving the boot data from the next of the chiplets along the chiplet chain, each request-receiving chiplet of the chiplets stores the boot data in the local cache of the request-receiving chiplet.

3. The system of claim 2, wherein the chiplet chain includes a first of the chiplets that is operably coupled to the memory at a first end of the chiplet chain, a last of the chiplets that is at a second end of the chiplet chain opposite the first end, and a remainder of the chiplets positioned in the chiplet chain between the first chiplet and the last chiplet.

4. The system of claim 3, wherein the last and the remainder of the chiplets are not directly operably coupled with the memory.

5. The system of claim 3, wherein not the last of the chiplets, but the first and the remainder of the chiplets each include the local cache, a local cache controller and a local cache arbitrator.

6. The system of claim 5, wherein when the another of the chiplets is one of the remainder of the chiplets, the another of the chiplets checks the local cache of the another of the chiplets for the boot data before sending the request for the boot data to the request-receiving chiplet.

7. The system of claim 3, wherein upon receiving a plurality of requests for access to the local cache, the local cache arbiter determines which of the requests to process first.

8. The system of claim 1, wherein the memory is a static random access memory.

9. The system of claim 1, wherein the boot data comprises a secondary bootloader for performing one or more initializations for the chiplets.

10. The system of claim 1, further comprising a plurality of additional chiplets each configured to perform a different subset of the set of functions, wherein the plurality of additional chiplets are serially operably coupled to each other forming an additional chiplet chain.

11. The system of claim 10, wherein, during the chiplet boot process, upon receiving a request for additional boot data from the another of the chiplets, each request-receiving chiplet of the chiplets:
  checks the local cache of the request-receiving chiplet for the additional boot data and returns the additional boot data to the another of the chiplets when the additional boot data is found in the local cache of the request-receiving chiplet; and
  transmits the request for the additional boot data to the next of the chiplets along the chiplet chain when the additional boot data is not found in the local cache of the request-receiving chiplet.

12. The system of claim 11, wherein upon receiving the additional boot data from the next of the chiplets along the chiplet chain, each request-receiving chiplet of the chiplets replaces the boot data with the additional boot data in the local cache of the request-receiving chiplet.

13. A multi-chiplet module comprising a plurality of chiplets each configured to perform a subset of a set of functions of the multi-chiplet module, wherein the plurality of chiplets are serially operably coupled to each other forming a chiplet chain, and further wherein, during a chiplet boot process, upon receiving a request for the boot data from another of the chiplets, each request-receiving chiplet of the chiplets:
  checks a local cache of the request-receiving chiplet for the requested boot data and returns the requested boot data to the another of the chiplets when the boot data is found in the local cache of the request-receiving chiplet; and
  transmits the request for the boot data to a next of the chiplets along the chiplet chain when the boot data is not found in the local cache of the request-receiving chiplet.

14. The multi-chiplet module of claim 13, wherein upon receiving the boot data from the next of the chiplets along the chiplet chain, each request-receiving chiplet of the chiplets stores the boot data in the local cache of the request-receiving chiplet.

15. The multi-chiplet module of claim 14, wherein the chiplet chain includes a first of the chiplets positioned at a first end of the chiplet chain and operably coupled to a memory storing the boot data, a last of the chiplets that is at a second end of the chiplet chain opposite the first end, and a remainder of the chiplets positioned in the chiplet chain between the first chiplet and the last chiplet.

16. The multi-chiplet module of claim 15, wherein the last and the remainder of the chiplets are not directly operably coupled with the memory.

17. The multi-chiplet module of claim 15, wherein not the last of the chiplets, but the first and the remainder of the chiplets each include the local cache, a local cache controller and a local cache arbitrator.

18. The multi-chiplet module of claim 17, wherein when the another of the chiplets is one of the remainder of the chiplets, the another of the chiplets checks the local cache of the another of the chiplets for the boot data before sending the request for the boot data to the request-receiving chiplet.

19. The multi-chiplet module of claim 15, wherein upon receiving a plurality of requests for access to the local cache, the local cache arbiter determines which of the requests to process first.

20. The multi-chiplet module of claim 13, wherein the boot data comprises a secondary bootloader for performing one or more initializations for the chiplets.

21. The multi-chiplet module of claim 13, further comprising a plurality of additional chiplets each configured to perform a different subset of the set of functions, wherein the plurality of additional chiplets are serially operably coupled to each other forming an additional chiplet chain.

22. The multi-chiplet module n of claim 21, wherein, during the chiplet boot process, upon receiving a request for additional boot data from the another of the chiplets, each request-receiving chiplet of the chiplets:
  checks the local cache of the request-receiving chiplet for the additional boot data and returns the additional boot data to the another of the chiplets when the additional boot data is found in the local cache of the request-receiving chiplet; and
  transmits the request for the additional boot data to the next of the chiplets along the chiplet chain when the additional boot data is not found in the local cache of the request-receiving chiplet.

23. The multi-chiplet module of claim 22, wherein upon receiving the additional boot data from the next of the chiplets along the chiplet chain, each request-receiving chiplet of the chiplets replaces the boot data with the additional boot data in the local cache of the request-receiving chiplet.

24. A method of implementing a multi-chiplet module system for providing a set of functions, the method comprising:
  storing chiplet operational data including boot data on a computer readable memory;
  providing a plurality of chiplets each configured to perform a subset of the set of functions, wherein the plurality of chiplets are serially operably coupled to each other forming a chiplet chain;
  upon receiving a request for the boot data from another of the chiplets, with each request-receiving chiplet of the chiplets:

checking a local cache of the request-receiving chiplet for the requested boot data and returns the requested boot data to the another of the chiplets when the boot data is found in the local cache of the request-receiving chiplet; and transmitting the request for the boot data to a next of the chiplets along the chiplet chain when the boot data is not found in the local cache of the request-receiving chiplet.

25. The method of claim 24, further comprising upon receiving the boot data from the next of the chiplets along the chiplet chain, with each request-receiving chiplet of the chiplets, storing the boot data in the local cache of the request-receiving chiplet.

26. The method of claim 25, wherein the chiplet chain includes a first of the chiplets that is operably coupled to the memory at a first end of the chiplet chain, a last of the chiplets that is at a second end of the chiplet chain opposite the first end, and a remainder of the chiplets positioned in the chiplet chain between the first chiplet and the last chiplet.

27. The method of claim 26, wherein the last and the remainder of the chiplets are not directly operably coupled with the memory.

28. The method of claim 26, wherein not the last of the chiplets, but the first and the remainder of the chiplets each include the local cache, a local cache controller and a local cache arbitrator.

29. The method of claim 28, further comprising when the another of the chiplets is one of the remainder of the chiplets, checking the local cache of the another of the chiplets for the boot data before sending the request for the boot data to the request-receiving chiplet.

30. The method of claim 26, further comprising upon receiving a plurality of requests for access to the local cache, determining with the local cache arbiter which of the requests to process first.

31. The method of claim 24, wherein the memory is a static random access memory.

32. The method of claim 24, wherein the boot data comprises a secondary bootloader for performing one or more initializations for the chiplets.

33. The method of claim 24, further comprising providing a plurality of additional chiplets each configured to perform a different subset of the set of functions, wherein the plurality of additional chiplets are serially operably coupled to each other forming an additional chiplet chain.

34. The method of claim 33, further comprising, during the chiplet boot process, upon receiving a request for additional boot data from the another of the chiplets, with each request-receiving chiplet of the chiplets:

checking the local cache of the request-receiving chiplet for the additional boot data and returning the additional boot data to the another of the chiplets when the additional boot data is found in the local cache of the request-receiving chiplet; and transmitting the request for the additional boot data to the next of the chiplets along the chiplet chain when the additional boot data is not found in the local cache of the request-receiving chiplet.

35. The method of claim 34, further comprising upon receiving the additional boot data from the next of the chiplets along the chiplet chain, with each request-receiving chiplet of the chiplets, replacing the boot data with the additional boot data in the local cache of the request-receiving chiplet.

36. A data processing system, the system comprising:
means for storing chiplet operational data including boot data;
means for providing a set of functions, the means for providing a set of functions including a plurality of chiplets each configured to perform a subset of the set of functions, wherein the plurality of chiplets are serially operably coupled to each other forming a chiplet chain, and further wherein, during a chiplet boot process, upon receiving a request for the boot data from another of the chiplets, each request-receiving chiplet of the chiplets:

checks a local cache of the request-receiving chiplet for the requested boot data and returns the requested boot data to the another of the chiplets when the boot data is found in the local cache of the request-receiving chiplet; and transmits the request for the boot data to a next of the chiplets along the chiplet chain when the boot data is not found in the local cache of the request-receiving chiplet.

* * * * *